United States Patent Office 3,254,286
Patented May 31, 1966

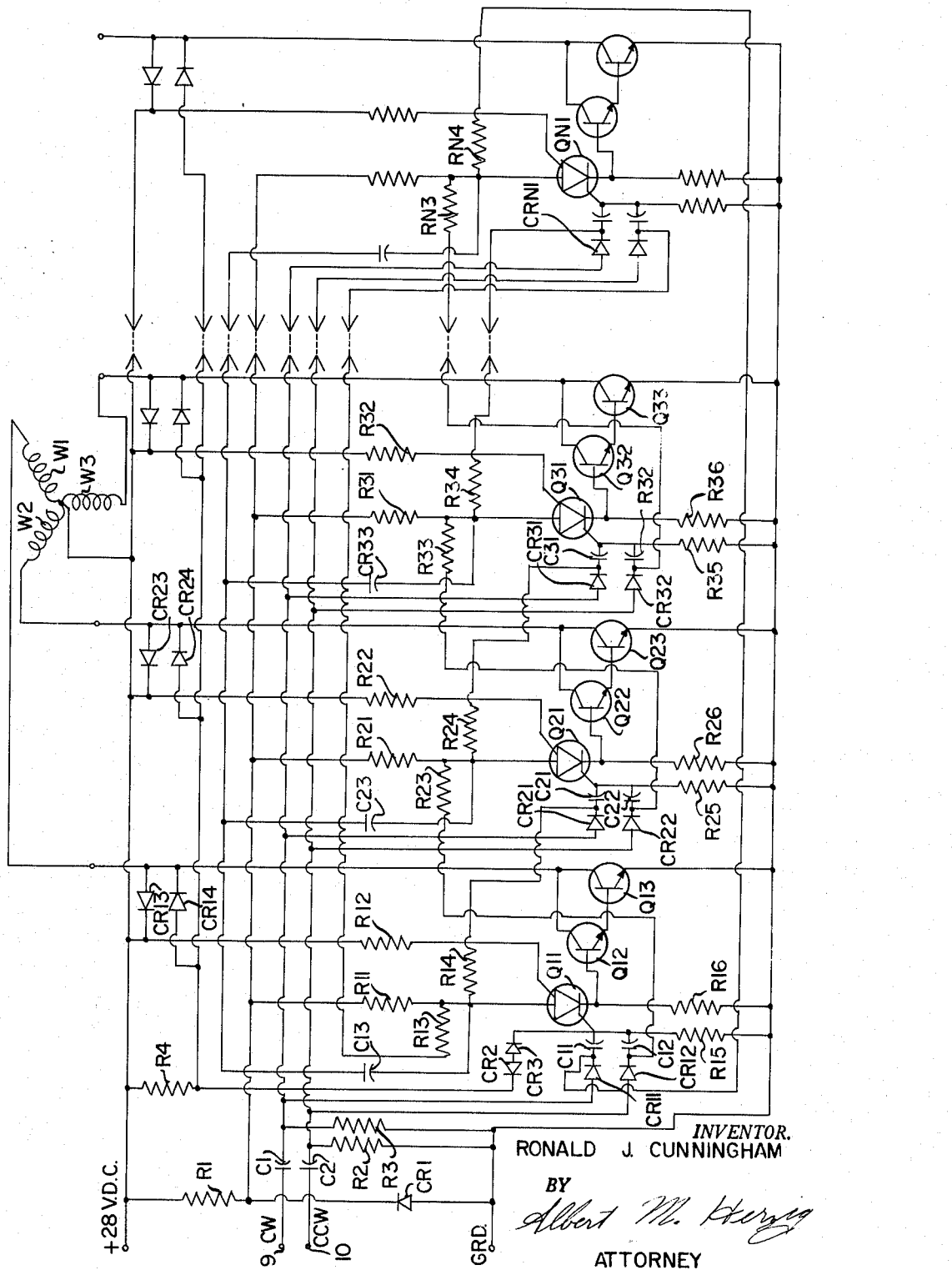

3,254,286
STEP MOTOR CONTROLLER
Ronald J. Cunningham, 2445 Riverside Place,
Los Angeles, Calif.
Filed Jan. 20, 1964, Ser. No. 338,833
3 Claims. (Cl. 318—138)

This invention relates to a control means or control circuit primarily adapted for the control of electrical stepper motors. The control means is adapted for use with any of various types of stepper motors and is described herein by way of example as applied to a stepper motor having two or more windings. This motor may be of the type for example, as shown in the prior application Serial No. 291,702 filed July 1, 1963, of Anthony P. Morreale. The invention is applicable to stepper motors having different numbers of windings in a similar manner to that described in detail herein.

In the operation of stepper motors of this type, it is desired that the windings be energized and de-energized successively in order, either in a clockwise direction or a counter-clockwise direction so as to produce stepping rotative motion in either one direction or the other. Discrete pulses of predetermined shape are applied uniformly to the control circuit in order to produce the desired stepping action unambiguously and in synchronism with the pulses. That is, the position of the stepper motor is always exactly in accord with the pulses that have been applied to that point without the stepper motor having missed or gained a step with respect to the pulses that have been supplied.

The primary object of this invention is to provide a new and improved circuit controller for applying the pulses to the stepper motor in the manner described, i.e., successively in order to produce stepping motion in one direction or the other unambiguously.

Another object is to provide a circuit as referred to in the foregoing wherein the circuit has a plurality of stages corresponding to the number of windings of the stepper motor, the circuit being arranged for clockwise stepping movement of the motor, and counter-clockwise stepping movement in response to pulses of the same or opposite polarity, input circuits being provided for each direction of movement.

Another object is to provide a control circuit as referred to in the foregoing wherein means are provided interrelating the stages so that operation of a stage prepares an adjacent stage or stages for operation in response to the next pulses producing rotary stepping movement in a predetermined direction either clockwise or counter-clockwise, depending upon the input circuit.

Another object is to provide a circuit controller as in the foregoing wherein each stage includes a silicon control switch having a plurality of electrodes and means connecting the silicon switches to corresponding silicon switches of adjacent stages in a manner whereby the operation of one stage prepares an adjacent stage or stages for subsequent operation in response to the next pulse by resetting the control voltage of a control electrode of the silicon switch of that stage.

The input circuits may be set up if desired, so that positive and negative input pulses produce stepping movement of the motor in opposite directions so that it performs an integrating function. An object of the invention is to provide a controller circuit adapted to realization of this purpose.

Further objects and advantages of the invention will become apparent from the following detailed description and drawing.

The single figure of the drawings is a schematic circuit diagram illustrating a preferred form of the invention as applied to a stepper motor having three windings, but showing the application of the invention to a motor having any number, N, windings.

In the circuit diagram the three windings are designated W1, W2 and W3 connected in a star pattern with the center returned to plus 28 volts or any positive voltage as necessary to operate the motor.

The control circuit may be supplied as shown, with a power supply of positive 28-volt D.C. for example. The input to the circuit is designated by the terminal CW(9) and CCW(10) for clockwise stepping rotation and counter-clockwise stepping rotation, respectively. That is, if positive or negative pulses are supplied to the CW terminal, the rotation is clockwise and if positive or negative pulses are supplied to the CCW terminal, the rotation is counter-clockwise.

The control circuitry may be considered to be divided into stages 1, 2 and 3 for the respective windings W1, W2 and W3. The stages are alike and there may be any number of them, i.e., N stages, corresponding to a similar number of windings embodied in the stepper motor. The principle of operation is the same irrespective of the number of stages.

The circuit elements in each stage are alike and are numbered for identification in accordance with the respective stage they appear in.

The circuit elements and the interconnections in the first stage and between stages, will be described in detail, it being understood that this description as to one stage applies similarly to the subsequent stages. The complete operation of the system will then be described. At the outset, it should be understood that broadly, the operating sequence achieved by the circuit or controller is that the circuit operates to energize the three windings sequentially (and unambiguously) in one direction or the other. That is, for example, if at the outset each of the stages is off, with its respective winding off, and stage 1 energizes its winding, the next event will be the energization or turning on of stage 2 and the turning off of stage 1; the next subsequent event will be the turning on of stage 2. This cycle of events may transpire either in a clockwise or a counter-clockwise direction.

Referring to stage 1, i.e., a principal element or component is the switching device Q11. Preferably this is a commercially available switching device which is a silicon control switch and may, for example be a switch which is the product of the General Electric Company designated "3N60." This is a solid state device which is composed of four layers of silicon to each of which layers there is a connection as a control electrode. The device is a switching device which may be turned on or off from two of the electrodes which are called the "gate cathode" and the "gate anode." The other two terminals are described as the cathode and anode. This device operates in the manner of conventional four-layer devices, i.e., when a small voltage is applied to one of the gates with the proper polarity and amplitude, the device conducts. If a polarity of plus on the anode and minus on the cathode exists, the device will remain in this state, conducting, until the device is limited by either current or voltage below what is known as the holding current level symbolized by $I_h$. In operation, one after another of the switching devices Q11, Q21 and Q31 is turned on and turned off sequentially. An output is taken from the cathode resistor R16 of the device Q11 which is coupled to the base of transistor Q12 in a Darlington connection compound amplifier comprised of the transistors Q12 and Q13. The amplifier is a switching device controlling the flow through the winding W1 of the stepper motor. The sequence of operations for a 3-phase, i.e., three windings stepper motor, is one on, one off; two on, two off; three on; three off; one on. For a four or 6-phase unit, the number would continue, one through four through six, repeating back to one. The switch constituted by the Darlington amplifier is protected in the normal manner from the reverse inductive voltage of the winding W1 by a diode clamp CR13 returning to the B+ line.

A power supply supplying 28 volts D.C. is provided for the controller. The stepping pulses are inserted at the terminals identified as CW(9) and CCW(10) for clockwise rotation and counter-clockwise rotation. Resistance R1 is across the 28 volt supply in series with the Zener diode CR1 which holds or clamps the voltage on the anodes of the switching devices Q11, Q21 and Q31, through resistors R11, R21, and R31. Capacitor C1 and resistor R3, and capacitor C2 and resistor R2 provide filtering circuits across the lines coupling the incoming input pulses to the cathode gate control of the switching devices Q11, Q21 and Q31. The CW line is coupled through CR11 diode and capacitor C11 to the cathode gate control of the switching device Q11. The CCW line is coupled through diode CR12 and capacitor C12 to the cathode gate control of the switching device Q11. The voltage on the cathode gate control being normally controlled by resistor R15 connected to ground.

Resistor R4 is connected from the positive side of the 28 volt power supply through a Zener voltage limiting diode CR2 and diode CR3 to a terminal between capacitor C11 and the gate cathode control of the switching device Q11 and to resistor R15 providing biasing voltage on the gate cathode control of switching device Q11.

Resistor R11 connects resistor R1 to the anode of the switching device Q11 providing anode bias voltage. Resistor R12 connects from the positive side of the 28 volt power supply to the gate anode of the switching device Q11. Resistor R13 is connected to the anode of switching devices Q11 and it connects to the control input of a subsequent stage (i.e., N stages). Resistor R14 is connected to the anode of the switching device Q11 and it is coupled to the input to the next successive stage, being connected to a terminal between diode CR21 and capacitor C21 of the second stage.

Capacitor C13 couples the anode of switching device Q11 to the anodes of subsequent stages.

The cathode circuit of switching device Q11 is coupled to the base of transistor Q12. The emitter of this transistor is connected to the base of transistor Q13. The collector electrodes of these transistors are connected to a common terminal and to the winding W1. The positive side of the 28 voltage supply is blocked from this winding by diode CR13 and the induced voltage in this winding is blocked from resistor R4 by the diode CR14. The transistors Q12 and Q13 provide a Darlington switching amplifier circuit controlling the winding W1, as described in the foregoing.

The circuitry of subsequent stages is similar to that described above. It will be observed that the first stage is connected to exert a preparatory control influence on the next stage in order, the purpose of which will become more apparent as the description proceeds.

It will be observed that the last or final or stage (N stage) is connected by a feed back circuit from the anode of the switching device QN1 and resistor RN4 back to a terminal between diodes CR11 and capacitor C11. The terminal between diode CR12 and the capacitor C12 of the first stage is coupled through the resistor R23 of the second stage to the anode of switching device Q21. A similar connection is provided between diode CR22 and capacitor C22 of the second stage through the resistor R33 of the third stage to the switching device Q31 of the third stage.

Having described the circuit elements of each stage and their interconnections, the complete operating sequence of the controller or control circuit is as follows. At the outset, the anodes of the switching device Q11, Q21 and Q31 are energized through the resistors R11, R21, and R31. This voltage is supplied through resistor R1 which is clamped at a 20-volt level by eZner diode CR1. The purpose of this single diode is to prevent the anode voltage from equalling the gate anode voltage, as will be described hereinafter. As long as the anode voltage is less than the gate anode potential, the switching device Q11 is biased in the "Off" condition which helps considerably in higher temperature operation as well as reducing the effects of DV/DT, i.e., rate of change (and more) the return effect. This condition of the circuit when the 28 volts are applied is that anode voltage is supplied to Q11, gate anode voltage exists; the voltage drop across R4 is negligible supplying full line voltage to the diodes CR14, CR24 and CR34, as well as to diode CR2, and diode CR3, through to the gate control of the switching device Q11. An input of voltage of the proper pulse and amplitude will turn on Q11. When Q11 turns on, i.e., conducts, a voltage drop exists across the resistors R11 and R12 which develops a voltage drop across resistor R16 which is applied to the bases of transistors Q12 and Q13. The positive potential turns on, i.e., causes transistors Q12 and Q13 to conduct. At this time the resistors R13 and R14 predetermine the direction, i.e., the sequence of conditions for the next stage to be excited, i.e., stage 2 of stage N. In other words, resistors R13 and R14 determine whether the direction of pulsing and rotation is to be clockwise or counter-clockwise. The anode end of resistors R13 and R14 will be at the same potential as the anode of switching device Q11. Because these devices return to a lower potential and are blocked by diodes CR21 and CRN1, there is no voltage drop across either resistor R13 or R14 which means that the junction of diode CR21, capacitor C21, capacitor C22, resistor R25 and the gate anode of switching device Q21 are at the same potential. When a positive pulse is applied to the clockwise input line No. 9 with an amplitude of 10 volts and a polarity that is positive, it will be coupled through capacitor C1, diode CR21 onto capacitor C21 to the switching device Q21. Had switching device Q11 not been conducted, the voltage at the junction of diode CR21 and capacitor C21 would have been equal to 20 volts. Therefore, an input pulse of 10 volts would not have exceeded the electrical balance of capacitor C21 and therefore it would not have produced a positive pulse at the junction of capacitor C21, capacitor C22 and resistor R25. This condition exists for the transfer of each state and continues as long as successive pulses are applied to the system. In other words, the operation of any stage sets up the next successive stage in a condition so that it can be triggered by the next successive pulse.

The stage that is triggered, i.e., the direction in which the sequence progresses is determined by the input circuit to which is applied the incoming pulses. In this manner, the circuit is completely automatic in receiving the incoming pulses and then causing the stepper motor to operate in steps, unambiguously and positively without error in either direction.

From the foregoing those skilled in the art will observe that the invention achieves and realizes all of the objects and advantages as stated in the foregoing as well as having many additional advantages that are apparent from the detailed description. The circuit of the invention is adaptable to use with various types of stepper motors and is adapted to receiving controlling pulses from many different types of sources. The invention, therefore, has a wide range of adaptation and utility, being useful throughout a wide range of industrial control, and similar applications wherever it is desired to operate a stepper motor unambiguously in response to incoming control pulses.

The foregoing disclosure is representative of a preferred form of the invention and is to be interpreted in an illustrative rather than a limiting sense. The embodiment of the circuitry shown illustrates the principal and preferred operating sequence of the electronic components. Some variations may be made in the details of circuit components and wiring interconnections without departing from the primary principle involved and without departing from equivalence, in principle.

I claim:

1. A controlling circuit for a stepper motor having a plurality of windings for causing the stepper motor to operate in discrete steps in response to applied voltage pulses in one direction or the other, comprising in combination, circuit means including a source of voltage and an input source of discrete pulses, said circuit means comprising connected stages, there being a stage corresponding to each of a plurality of windings of the stepper motor, each of said stages comprising switching means connected to energize its respective motor winding in response to an incoming controlling pulse, said switching means of each stage being coupled to the switching means of adjacent stages whereby when the switching means of any stage is caused to operate said switching means exerts an influence on the switching means of an adjacent stage so that the next incoming pulse causes operation of the switching means of an adjacent stage in a direction, i.e., clockwise or counter-clockwise, depending upon the input source of incoming pulses, the switching means of each stage including a silicon switching device having a plurality of electrodes, including a gate anode and a gate cathode, the threshold at which the switching device conducts in response to the gate cathode being dependent upon the voltage on the gate anode whereby when the said switching device of one stage is conducted a voltage is impressed on the gate anode of the switching device of an adjacent stage preparing that switching device to be conducted in response to the next subsequent incoming control pulse.

2. A circuit controller as in claim 1 wherein the switching device of each stage is coupled through its anode to the anode and gate cathode of both of its adjacent stages.

3. A controlling circuit for a stepper motor having a plurality of windings for causing the stepper motor to operate in discrete steps in response to applied voltage pulses in one direction or the other, comprising in combination, circuit means including a source of voltage and an input source of discrete pulses, said circuit means comprising connected stages, there being a stage corresponding to each of a plurality of windings of the stepper motor, each of said stages comprising switching means connected to energize its respective motor winding in response to an incoming controlling pulse, said switching means of each stage being coupled to the switching means of adjacent stages whereby when the switching means of any stage is caused to operate said switching means exerts an influence on the switching means of an adjacent stage so that the next incoming pulse causes operation of the switching means of an adjacent stage in a direction, i.e., clockwise or counterclockwise, depending upon the input source of incoming pulses, the said switching device of each stage comprising a silicon control device having electrodes including an anode, a cathode, a gate anode and a gate cathode, means normally controlling the voltage on the anode and gate anode, means coupling the anode of the switching device of each stage to the gate cathode of adjacent stages, and means coupling the gate cathode of the switching device of each stage to the anode of the switching devices of adjacent stages in each direction, i.e., clockwise and counter-clockwise, with reference to the motor windings.

References Cited by the Examiner

UNITED STATES PATENTS

| | | | |
|---|---|---|---|
| 2,980,839 | 4/1961 | Haeussermann | 318—138 |
| 2,994,813 | 8/1961 | Towner et al. | 318—138 |
| 3,165,685 | 1/1965 | Manteuffel et al. | 318—138 |
| 3,185,910 | 5/1965 | Knapp | 318—138 |

ORIS L. RADER, *Primary Examiner.*

MILTON O. HIRSCHFIELD, *Examiner.*

S. GORDON, *Assistant Examiner.*